United States Patent [19]
Jones et al.

[11] Patent Number: 5,479,080
[45] Date of Patent: Dec. 26, 1995

[54] SIMULTANEOUS MULTIPLE VOLTAGE LEVEL BRIDGE-TYPE INVERTER/CONVERTER UNIT FOR AN ELECTRONICALLY COMMUTATED ELECTRICAL MACHINE

[75] Inventors: William D. Jones, Swampscott, Mass.; Arthur V. Radun, Ballston Lake, N.Y.

[73] Assignee: General Electric Company, Cincinnati, Ohio

[21] Appl. No.: 97,245

[22] Filed: Jul. 23, 1993

[51] Int. Cl.$^6$ .................................................. H02P 7/36
[52] U.S. Cl. .................................................. 318/701
[58] Field of Search .................. 318/696, 138, 318/254, 439, 701; 310/68 D, 176, 189, 198, 200; 320/63, 64, 65; 322/89, 90, 93, 94

[56] References Cited

U.S. PATENT DOCUMENTS

| | | | |
|---|---|---|---|
| 4,045,718 | 8/1977 | Gray | 320/17 |
| 4,348,619 | 9/1982 | Ray et al. | 318/139 |
| 4,459,502 | 7/1984 | El-Antably | 310/184 |
| 4,731,570 | 3/1988 | Lee | 318/696 |
| 4,896,089 | 1/1990 | Kliman et al. | 318/701 |
| 4,983,902 | 1/1991 | Palaniappan et al. | 318/701 |

*Primary Examiner*—Bentsu Ro
*Attorney, Agent, or Firm*—Andrew C. Hess; Patrick R. Scanlon

[57] ABSTRACT

A modified inverter/converter unit electronically commutates a switched reluctance machine to provide multiple voltage levels for engine and aircraft applications. A set of power switching transistors apply an exciting current to windings in the switched reluctance machine to produce power at a first voltage level. Additional voltage levels may be provided by using the turns ratio from a plurality of transformers and the switching frequency from the power switching transistors. Alternatively, additional voltage levels may be provided by using windings of a plurality of transformers internal to the switched reluctance machine.

10 Claims, 3 Drawing Sheets

SIMULTANEOUS MULTIPLE VOLTAGE LEVEL BRIDGE-TYPE INVERTER/CONVERTER UNIT FOR AN ELECTRONICALLY COMMUTATED ELECTRICAL MACHINE

BACKGROUND OF THE INVENTION

The present invention relates to aircraft engine systems and, more particularly, to an electric starter/generator for aircraft, tank engines, and other mobile vehicles.

Existing bridge-type inverter/converter units used to electronically commutate a switched reluctance machine produce direct current electrical power at only one voltage level at a time when in the generating mode. This creates a problem for vehicles that require dc power of at least two different voltage levels, most commonly 270 vdc and 28 vdc.

Present day switched reluctance machines typically generate electric power at one voltage level. However, an electric power system, particularly in a vehicle, may require electric power at two or more voltage levels. One means for providing the two different voltage levels is to use an additional, external converter to convert electrical power from one voltage level to another. Unfortunately, the application of an external converter is an inefficient use of components, since it adds cost and volume to the system and reduces reliability.

It is therefore highly desirable and an object of the present invention to provide multiple voltage levels without the addition of an external converter.

Another object of the present invention is to provide a simultaneous multiple voltage level bridge-type inverter/converter unit for an electronically commutated electrical machine.

Another object of the present invention is to optimize electric power systems to engine and aircraft applications, extending design flexibility.

These objects and other features and advantages will become more readily apparent in the following description when taken in conjunction with the appended drawings.

SUMMARY OF THE INVENTION

The present invention has been developed to fulfill the needs noted above. The present invention uses a modified inverter/converter unit to electronically commutate a switched reluctance machine which is capable of permitting optimization of electric power systems for engine and aircraft applications. Electric power is supplied at multiple different levels from the same electronics, without an additional external converter. In addition, power can be supplied to a starter/generator machine during starting, while power at a different voltage level is simultaneously supplied to other pieces of equipment.

Briefly, in accordance with the present invention, multiple voltage levels are provided from the same device. In one embodiment, a method for providing multiple voltage levels comprises the steps of providing an inverter/converter unit, including a switched reluctance machine and further including a plurality of transformers. A set of power switching transistors applies an exciting current to windings in the switched reluctance machine to produce power at a first voltage level. With the turns ratio from the transformers and the switching frequency of the power switching transistors, at least one additional voltage level is provided. The value of the second voltage level is a fixed ratio of the value of the first voltage level given by the turns ratio of the transformer. This will be true for any number of voltage levels.

In accordance with a second embodiment of the present invention, the transformers are incorporated within the switched reluctance machine. This method for providing multiple voltage levels comprises the steps of providing an inverter/converter unit, including a switched reluctance machine having a plurality of transformers. A set of power switching transistors apply an exciting current to windings in the switched reluctance machine to produce power at a first voltage level. Additional windings inside the switched reluctance machine provide voltage at at least one additional voltage level.

In the drawings as hereinafter described, a preferred embodiment is depicted; however, various other modifications and alternative constructions can be made thereto without departing from the true spirit and scope of the invention. For example, the process can be applied to a variety of engine and aircraft applications, including electric starter/generators for aircraft, tank engines, and other mobile vehicles.

DETAILED DESCRIPTION OF THE PREFERRED EMBODIMENTS

Figure 1:
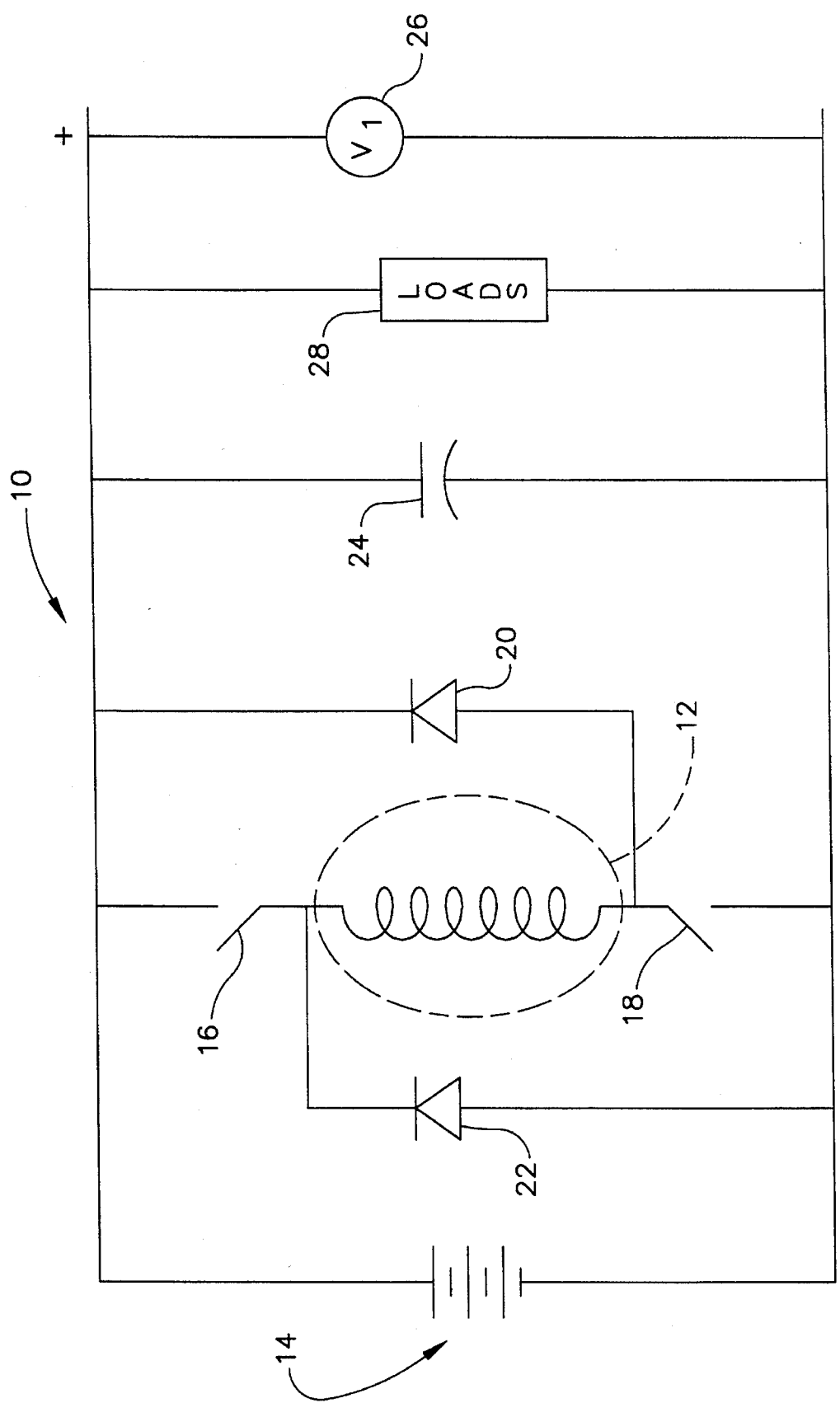
FIG. 1 is a schematic diagram of one phase of a prior art bridge-type inverter/converter unit.

Referring now to the drawings, in FIG. 1 there is illustrated a schematic diagram showing one phase of a prior art bridge-type inverter/converter unit 10, including one phase of a switched reluctance machine (SRM) 12. The SRM 12 is a synchronous machine that uses electronic commutation for proper operation. As is known in the art, a SRM includes a rotor, a stator, and a plurality of phase windings. The SRM 12 has no rotating windings or magnets for excitation, but only stationary windings on the stator that are excited with electric current from a power source such as battery 14 at the proper time before alignment to pull the rotor poles into alignment and thereby produce motoring action. To generate electric power, the SRM stator windings are excited when the rotor and stator poles are at or near alignment and de-excited as the two poles are pulling out of alignment. This produces a time rate of change of magnetic flux linking the stator and winding and thereby generates electric voltage and power. The application and removal of electric current to phase windings are performed by an electronic package referred to as the inverter/converter unit (ICU) 10 that performs the electronic commutation.

Continuing with FIG. 1, switches 16 and 18 are closed at the proper time to create a magnetic field that pulls the rotor and stator poles into alignment to produce motoring action. The switches 16 and 18 are closed at or prior to rotor and stator pole alignment and opened as the poles are being pulled out of alignment by a prime mover. The magnetic flux linkages of the machine windings of the SRM 12, undergo a time variation and produce a voltage that circulates currents through diodes 20 and 22 to charge capacitor 24 and produce a first voltage level 26 to supply loads 28.

Figure 2:
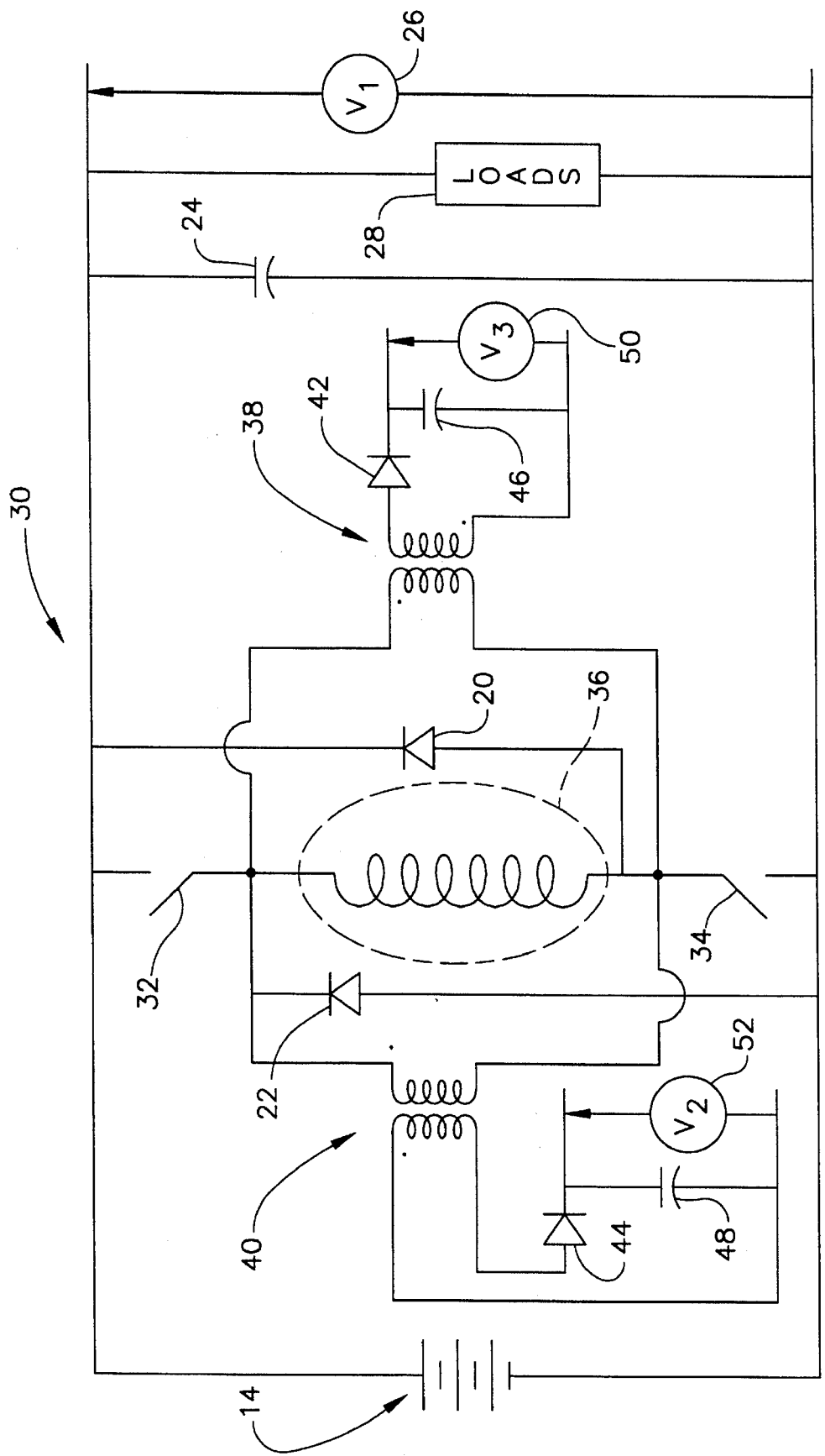
FIG. 2 is a schematic diagram, illustrating one phase, for achieving multiple levels of voltage from a switched reluctance machine inverter/converter unit, in accordance with the present invention.

Referring now to FIG. 2, the present invention incorporates additional circuitry inside inverter/converter unit 30 to produce electric power at two or more voltage levels. The present invention permits the use of one set of power switching transistors 32 and 34, to apply exciting current to both the SRM windings 36 and the multiple voltage level transformers 38 and 40.

Continuing with FIG. 2, when switches 32 and 34 close, current build up occurs in both the machine winding 36 and the primary windings of the transformers 38 and 40, establishing a flux linkage in the secondary windings of the transformers 38 and 40. Conversely, when switches 32 and 34 open, the current decays in the transformer 38 and 40 windings, inducing voltages in the secondary windings of the transformers 38 and 40, thereby causing current to flow in diodes 42 and 44, charging capacitors 46 and 48, and establishing voltages 50 and 52, respectively. Also, an alternating voltage can be accessed at points between the transformers secondary windings and diodes 42 and 44 to permit the operation of alternating current loads.

Figure 3:
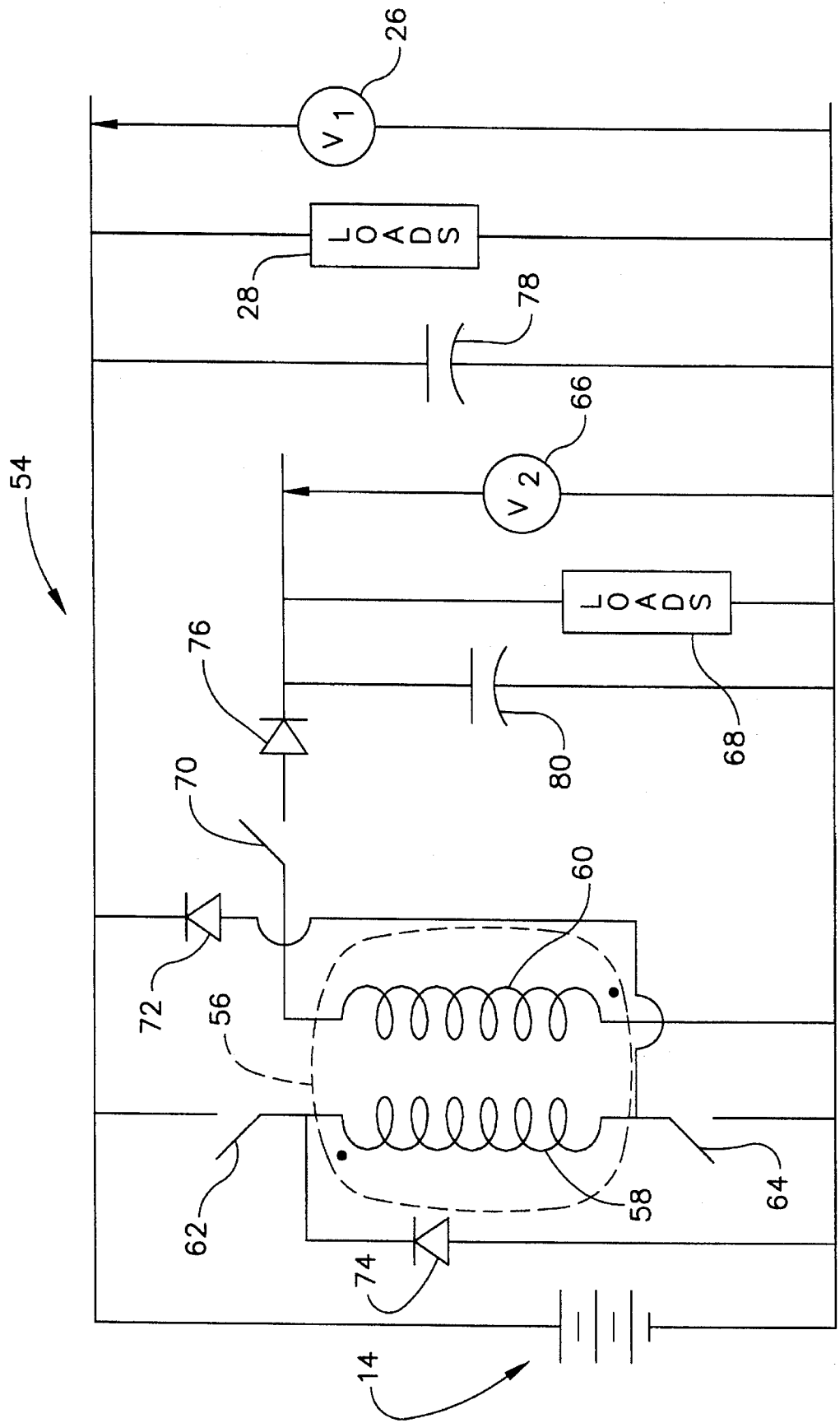
FIG. 3 is a schematic diagram, illustrating one phase, for achieving multiple levels of voltage from a switched reluctance machine inverter/converter unit, in accordance with an alternative embodiment of the present invention.

Referring now to FIG. 3, an alternative approach for the present invention is illustrated in circuit 54, incorporating a transformer inside SRM 56 instead of merely within the inverter/converter unit 54, as is illustrated in FIG. 2, with one phase shown. This is accomplished by including windings 58 and 60 inside the machine 56. Winding 58 is excited through power switching transistors 62 and 64. Winding 60 is excited through a magnetic coupling between the windings 58 and 60. A second voltage level 66, to supply loads 68, is then determined by the turns ratio between windings 58 and 60. Also, a switch 70 can be included to provide additional voltage regulation of the second voltage level 66.

The circuit of FIG. 3 further includes diodes 72, 74, and 76, and capacitors 78 and 80. Diodes 72 and 74 in FIG. 3 operate in a manner identical to diodes 20 and 22 in FIG. 1, providing a path for the generated power for voltage $V_1$, referenced as number 26. These same diodes turn off while the switches 62 and 64 are on and the phase winding is being excited. Thus, while the machine phase winding is being excited through switches 62 and 64, no current flows to the first voltage level 26 from the machine. Capacitor 78 supplies the required load current during this time.

Continuing with FIG. 3, diode operates in a manner similar to diodes 72 and 74, providing a path for generated power to the second voltage level $V_2$, referenced as number 66. Diode 76 turns off while the machine phase winding is being energized and then capacitor 80 supplies the load current for the second voltage level 66 during this time. Only one diode is required for the second voltage level 66 because the phase winding is not energized from this voltage level.

Although FIGS. 2 and 3 show three and two voltage levels being achieved, respectively, this is for purposes of illustration only, and is not to be considered as limiting the scope of the invention. As will be obvious to those skilled in the art, the concept of the present invention provides that three or more voltage levels can be obtained by the circuits illustrated in FIGS. 2 and 3 by adding additional windings.

It is seen from the foregoing, that the objectives of the present invention are effectively attained, and, since certain changes may be made in the construction set forth, it is intended that matters of detail be taken as illustrative and not in a limiting sense.

What is claimed is:

1. A method for providing multiple voltage levels comprising the steps of:

providing an inverter/converter unit to electronically commutate a switched reluctance machine;

providing a first transformer having a turns ratio and a second transformer having a turns ratio;

accessing an alternating voltage at points between secondary windings of the first and second transformers and diodes to permit operation of alternating current loads;

using at least one power switching transistor having a switching frequency to apply an exciting current to windings in the switched reluctance machine to produce power at a first voltage level;

using the turns ratio from the first and second transformers and the switching frequency from the at least one power switching transistor to provide at least one additional voltage level.

2. A method for providing multiple voltage levels as claimed in claim i further comprising the step of establishing a flux linkage in secondary windings of the first and second transformers.

3. A method for providing multiple voltage levels as claimed in claim 2 wherein the step of establishing a flux linkage in secondary windings of the first and second transformers comprises the step of allowing current build up to occur in windings in the switched reluctance machine and in primary windings of the first and second transformers when the at least one power switching transistor closes.

4. A method for providing multiple voltage levels as claimed in claim 1 wherein when the at least one power switching transistor opens, current decays in primary windings of the first and second transformers, inducing voltages in secondary windings of the transformers to establish at least one additional voltage level.

5. A method for providing multiple voltage levels comprising the steps of:

providing an inverter/converter unit to electronically commutate a switched reluctance machine, the switched reluctance machine including at least one transformer having windings;

using at least one power switching transistor having a switching frequency to apply an exciting current to windings in the switched reluctance machine to produce power at a first voltage level;

using the windings inside the switched reluctance machine to provide at least one additional voltage level.

6. A method for providing multiple voltage levels as claimed in claim 5 wherein the windings in the switched reluctance machine comprise a first winding and a second winding.

7. A method for providing multiple voltage levels as claimed in claim 6 wherein the first winding is excited through the at least one power switching transistor.

8. A method for providing multiple voltage levels as claimed in claim 6 wherein the second winding is excited through a magnetic coupling between the first and second windings.

9. A method for providing multiple voltage levels as claimed in claim 6 wherein a second voltage level is determined by a turns ratio between the first and second windings.

10. A method for providing multiple voltage levels as claimed in claim 9 further comprising the step of using a switch to provide voltage regulation of the second voltage level.

* * * * *